(12) United States Patent
Ziegelhoffer et al.

(10) Patent No.: US 6,368,437 B1
(45) Date of Patent: Apr. 9, 2002

(54) ROTARY BONDING APPARATUS AND METHOD

(75) Inventors: Paul Ziegelhoffer, Greenleaf; Bart Hardy, Green Bay; Michael Jarmuskiewicz, Sobieski; Frank Jocewicz, Green Bay, all of WI (US)

(73) Assignee: Paper Converting Machine Company, Green Bay, WI (US)

( * ) Notice: Subject to any disclaimer, the term of this patent is extended or adjusted under 35 U.S.C. 154(b) by 0 days.

(21) Appl. No.: 09/595,529

(22) Filed: Jun. 16, 2000

(51) Int. Cl.[7] ............................................. B30B 15/34
(52) U.S. Cl. ................... 156/73.1; 156/64; 156/308.4; 156/580.1; 156/580.2; 156/581; 156/583.1
(58) Field of Search ...................... 156/64, 73.1, 308.2, 156/308.4, 580, 580.1, 580.2, 581, 583.1

(56) References Cited

U.S. PATENT DOCUMENTS

| | | |
|---|---|---|
| 3,733,238 A | 5/1973 | Long et al. |
| 4,227,959 A | 10/1980 | Brown |
| 4,414,045 A | 11/1983 | Wang et al. |
| 4,713,132 A | 12/1987 | Abel et al. |
| 4,862,673 A | 9/1989 | Francioni |
| 4,949,846 A | 8/1990 | Lakey |
| 5,421,924 A | 6/1995 | Ziegelhoffer et al. |
| 5,464,497 A * | 11/1995 | Unthank ..................... 156/519 |
| 5,518,559 A | 5/1996 | Saindon et al. |
| 5,545,275 A | 8/1996 | Herrin et al. |
| 5,587,032 A | 12/1996 | Saindon et al. |
| 5,738,618 A | 4/1998 | Lemerand et al. |
| 5,817,199 A * | 10/1998 | Brennecke et al. ........ 156/73.1 |

OTHER PUBLICATIONS

"Ultrasonic Bonding of Nonwovens", TAPPI Journal, vol. 72, No. 5, May 1989.

* cited by examiner

Primary Examiner—James Sells

(57) ABSTRACT

A rotary bonding apparatus includes a rotatable drum and one or more bonding elements, for example, ultrasonic horn and anvil assemblies, which rotate with the drum. The drum includes a web-supporting surface, and web material which is to be bonded rotates with the drum. The web material is positioned between the bonding elements and the web and bonding elements rotate at the same velocity so that the bonding elements are stationary relative to the web being bonded.

25 Claims, 10 Drawing Sheets

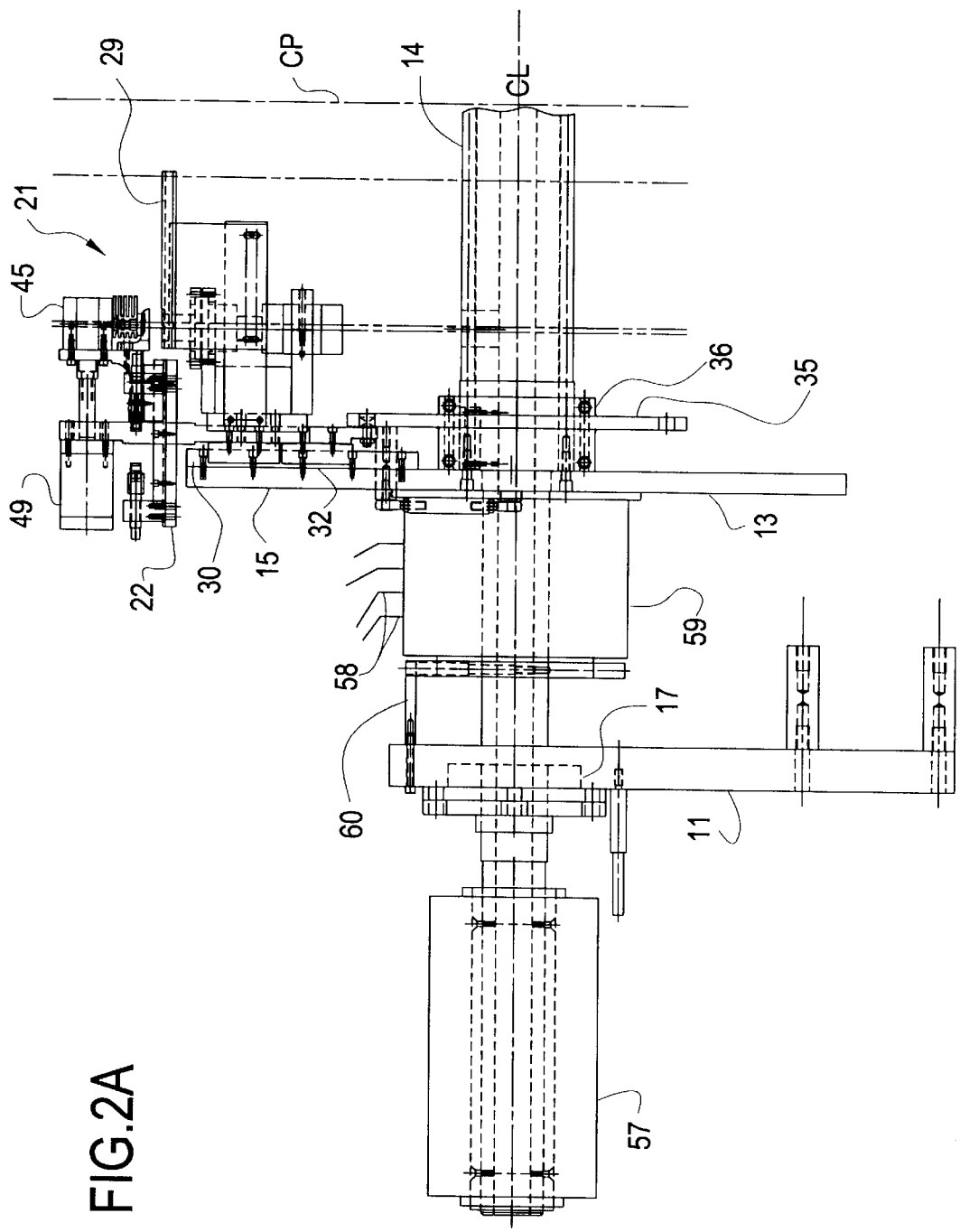

ROTARY BONDING APPARATUS AND METHOD

BACKGROUND

This invention relates to bonding, and, more particularly, to a rotary bonding apparatus in which the bonding elements are mounted on a rotating drum. The bonding elements remain stationary relative to web material which is supported on the drum during bonding.

Ultrasonic bonding and thermo bonding are commonly used for bonding various types of web material. For example, disposable diapers conventionally include moisture absorbent material which is sandwiched between outer layers of moisture impervious material such as polyethylene. The edges of the moisture impervious layers are bonded to seal the interior of the diaper.

Ultrasonic bonding is also conventionally used for making other types of garments, bags, and a wide variety of other products.

The principles of ultrasonic bonding and thermo bonding and the bonding equipment are well known and need not be described herein. Ultrasonic bonding is conventionally performed with an ultrasonic horn and an anvil. The material to be bonded is positioned between the horn and the anvil. High frequency electrical energy is converted to mechanical vibrations which are applied by the horn to the material.

Process variables for ultrasonic bonding include amplitude, pressure, and time. During the bonding time the material to be bonded is pressed between the horn and the anvil.

When products are formed from web material, for example, diapers, bags, etc., the web material may be advanced from an unwind to the horn and anvil. During the bonding time, the web material should be substantially stationary relative to the horn and the anvil.

Some ultrasonic bonding devices include horns and anvils which allow some limited movement with the web so that bonding can be performed without stopping the web. However, the bonding times that can be obtained without stopping the web are relatively short.

SUMMARY OF THE INVENTION

One or more bonding assemblies are mounted on a rotating drum. Web material is advanced to the drum and is supported by the drum as the drum rotates. Since the bonding assembly rotates with the drum, the bonding assembly is stationary relative to the drum. Bonding can be performed throughout the time during which the web material is supported by the drum without stopping the web. The bonding assembly can be an ultrasonic horn and anvil for ultrasonic bonding or a pair of heated elements for thermo bonding.

DESCRIPTION OF THE DRAWING

The invention will be explained in conjunction with illustrative embodiments shown in the accompanying drawing, in which

FIG. 2A is a fragmentary side elevational view of the front portion of the apparatus of FIG. 1;

DESCRIPTION OF SPECIFIC EMBODIMENTS

Figure 1:
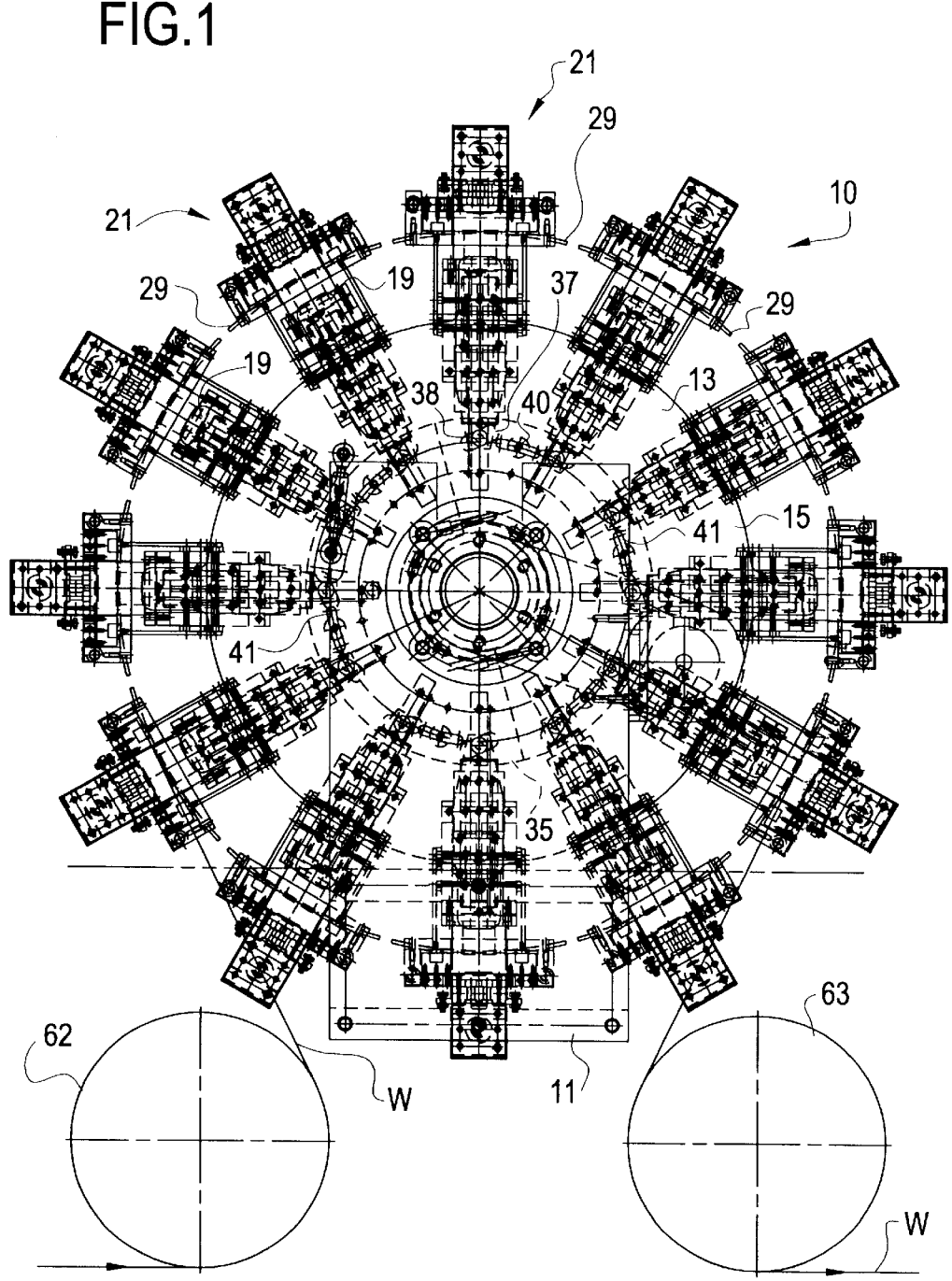
FIG. 1 is a fragmentary front elevational view of a rotary ultrasonic bonding apparatus which is formed in accordance with the invention.

Referring to FIGS. 1, 2A, 2B, and 3 an ultrasonic bonding apparatus 10 includes front and rear frames 11 and 12 and a drum 13 which is rotatably supported by the frames. The drum includes a horizontal central shaft 14 and vertically extending front and rear circular plates 15 and 16 which are secured to the shaft for rotation therewith. The shaft is supported for rotation about a horizontal axis CL by bearings 17 and 18 in the frame, and the ends of the shaft extend beyond the frames. The plates 15 and 16 include radial projections 19 for supporting the horn and anvil assemblies.

A plurality of ultrasonic horn and anvil assemblies 21 are mounted on both the front and rear plates 15 and 16 of the drum. The particular embodiment illustrated in FIG. 1 includes 12 horn and anvil assemblies, but more or less can be used depending upon the desired space between adjacent ultrasonic bonds.

Figure 5:
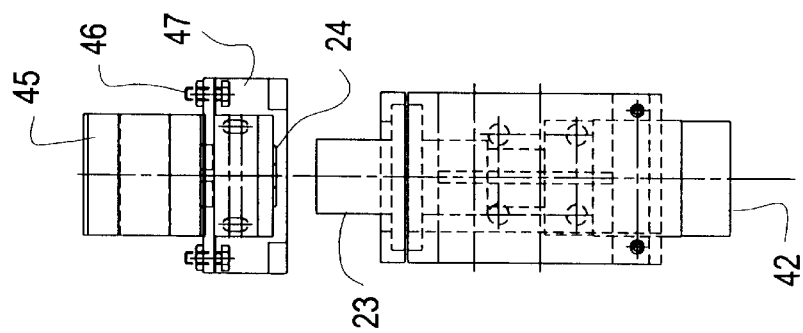
FIG. 5 is a rear view of the ultrasonic horn and anvil of FIG. 3.
Figure 4:
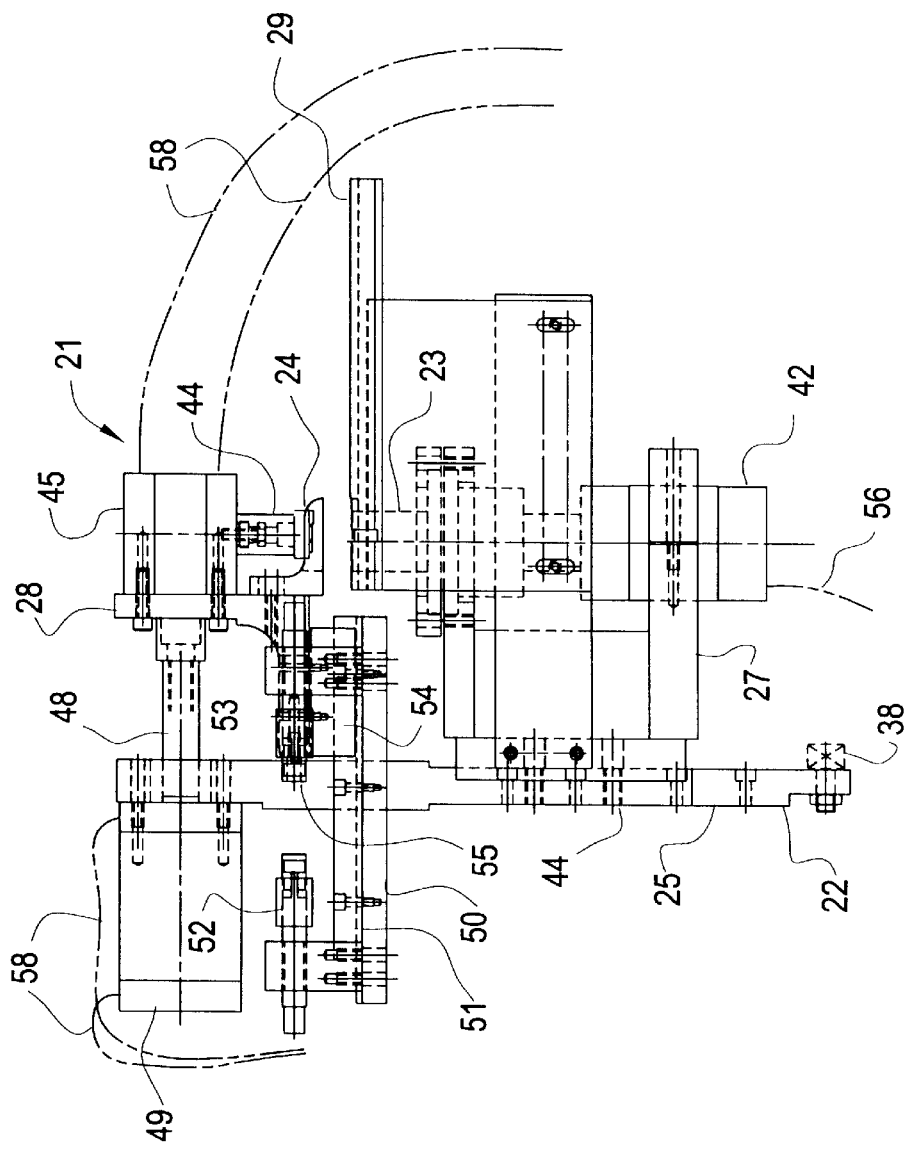
FIG. 4 is an enlarged view of one of the ultrasonic horn and anvil assemblies.

Each horn and anvil assembly includes a support frame 22, a conventional ultrasonic horn 23, and an anvil 24 (see also FIGS. 4 and 5). The support frame includes a radially extending plate 25 which is slidably attached to the front or rear plate 15 or 16 of the drum, a horn support frame 27, and an anvil support frame 28.

A curved web-supporting surface 29 is mounted on each of the horn support frames. The web-supporting surfaces provide an interrupted circular surface which defines the outer diameter of the drum.

Figure 3:
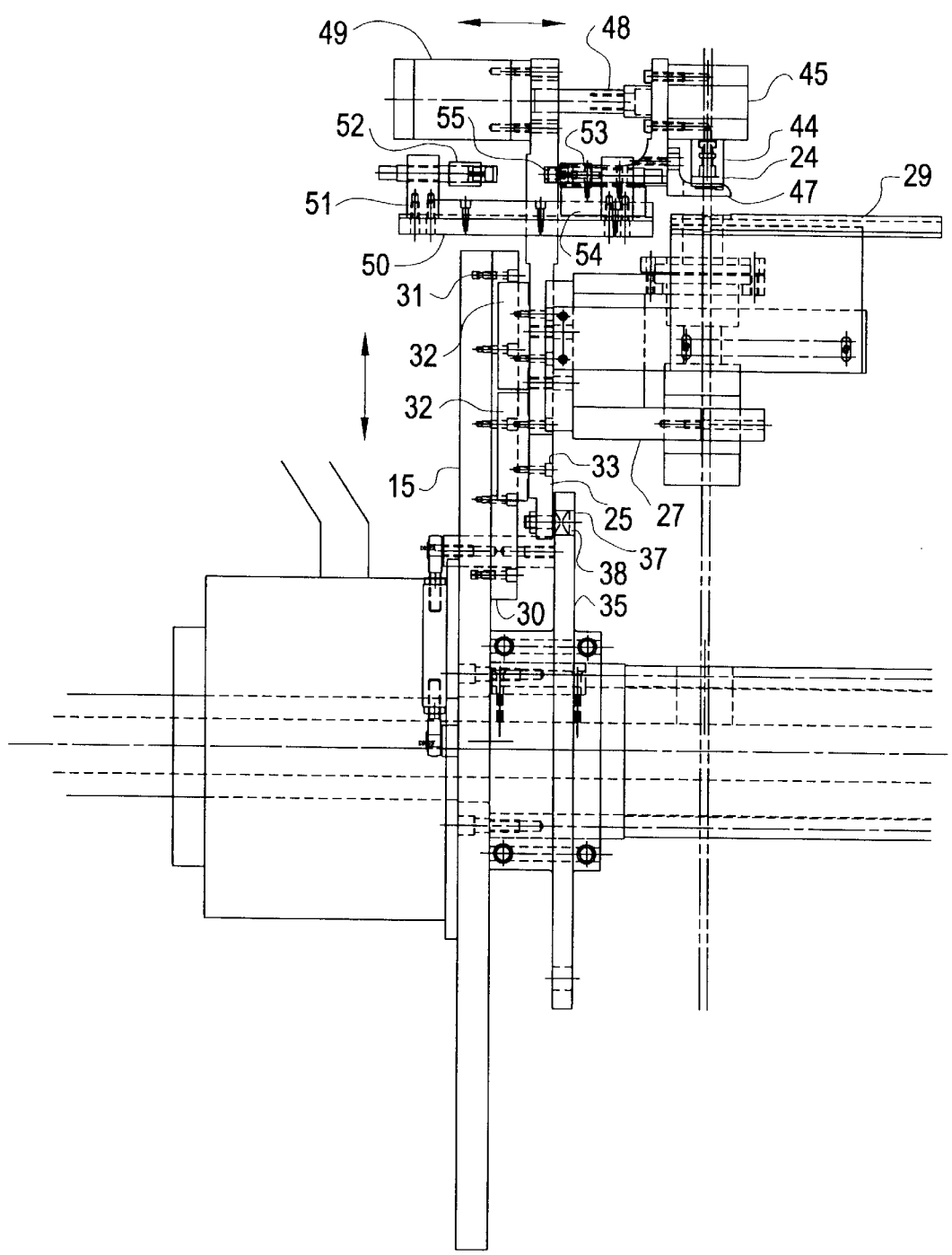
FIG. 3 is an enlarged fragmentary view of a portion of FIG. 2A.

Referring to FIG. 3, radially extending slide shafts 30 are secured to each of the drum plates 15 and 16 by screws 31. Each plate 25 of the support frames 22 is slidably secured to one of the slide shafts by linear bearings 32 which are secured to the plate by screws 33.

Radial adjustment of the plates 25 is accomplished by an adjusting plate 35 which is clamped to the shaft by a collar 36. The adjusting plate is provided with an angled camming slot 37 (FIG. 1) for each of the horn and anvil assemblies. A cam follower roller 38 is rotatably mounted on the lower end of each plate 25 and is positioned in the slot 37.

Simultaneous fine adjustment of the position of each of the horn and anvil assemblies and the diameter of the drum is achieved by loosening the collar 36 and rotating the collar and the adjusting plate 35 to cam the plates 25 radially outwardly or inwardly. The adjusting plate 35 is maintained centered with respect to the axis of the shaft by pins 40 on the plate which extend into curved slots 41 in the end plates 15 and 16 of the drum. Greater adjustment of the positions of the horn and anvil assemblies and the drum diameter can be achieved by changing the length of the plates 25 which carry the cam followers. Alternatively, the adjusting plate could be provided with multiple sets of slots, each set being located at a different radius from the axis of the shaft, or the cam followers 38 could be repositioned on a different radius.

Referring to FIGS. 4 and 5, each ultrasonic horn 23 is positioned in an opening in the web-supporting surface 29. An ultrasonic converter 42 converts electrical energy to mechanical vibrations which are applied to the horn. In one specific embodiment, a 30 kHz ultrasonic unit was used, but other units could be used, for example, 35 kHz and 40 kHz. Suitable commercial ultrasonic units are available from Branson Ultrasonics Corp. of Danbury, Conn.

Each horn support frame 27 is adjustably mounted on one of the plates 25 by bolts 43 (FIG. 4) which extend through radially extending slots in the plate. The horn support frames are adjusted until all of the horns are the same distance from the centerline of the shaft 14. After the initial setup of the horns, further adjustment can be obtained by rotating the adjusting plate 35.

Each anvil 24 is supported on a radially extending piston 44 which can be reciprocated by a double acting pneumatic cylinder 45 to move the anvil radially toward and away from the horn.

Figure 6:
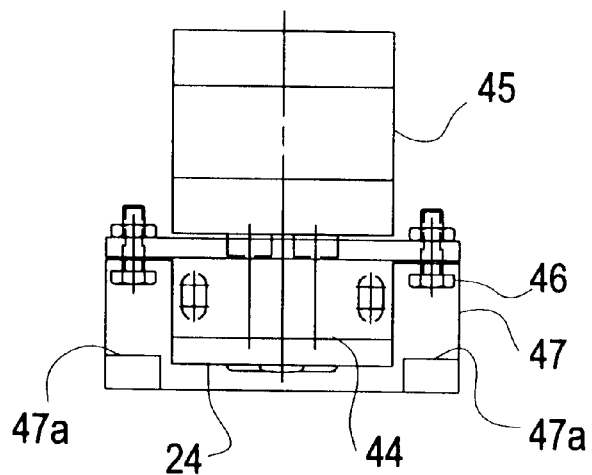
FIG. 6 is an enlarged view of the anvil of FIG. 5.
Figure 7:
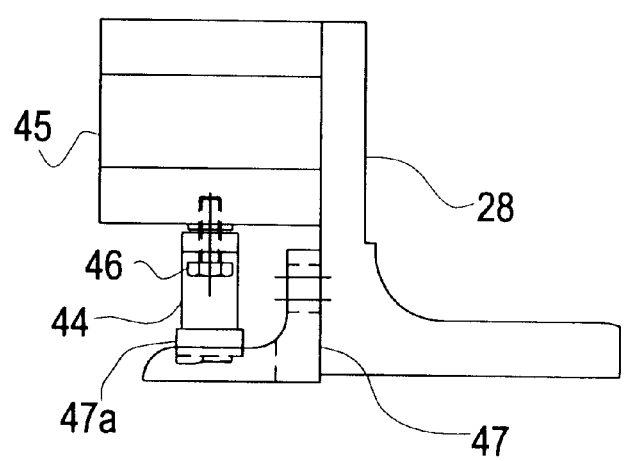
FIG. 7 is a side view of the anvil of FIG. 6.

Referring to FIGS. 6 and 7, bolts 46 are mounted on the piston 44 and are engageable with stop surfaces 47a on a C-shaped bracket 47. The stop surfaces are provided by spaced-apart legs on the bracket 47. The bolts are adjustable on the piston and provide adjustable stops for limiting radial movement of the anvil and for controlling the gap between the anvil and the horn.

The anvil to horn gap can be run in a "pressure only" mode in which the anvil compresses the web against the anvil or in a fixed gap mode in which anvil movement is limited by stops. The stops can advantageously be used to control the caliper of the finished product. The pressure which the anvil exerts on the web can be varied "on the fly" as the drum rotates by varying the pneumatic pressure in the cylinder 45.

Radial movement of the anvils can also be accomplished by cams and cam followers which move the anvils as the drum rotates.

Each anvil 24 is movable axially by a piston 48 which extends parallel to the axis of the drum and which can be reciprocated by a double acting pneumatic cylinder 49. The cylinder 49 is mounted on the vertical plate 25, and the piston 48 is connected to the support frame 28 for the anvil. A horizontal plate 50 is supported by the radial plate 25, and a pair of slide rails 51 are mounted on the plate 50 on both sides of the radial plate 25. Adjustable bumpers 52 and 53 are mounted at the ends of each slide rail. A pair of slide bearings 54 support the anvil frame 28 for sliding movement on the rails 51. A stop bar 55 on each slide baring 54 is engageable with the bumpers 51 and 53 to limit axial movement of the anvil. The stop bar is adjustable so that the sealing position of the anvil can be adjusted axially as desired.

Electrical power is supplied to each ultrasonic unit through wires 55 which connect the ultrasonic converter 44 to a conventional slip ring conductor 56. The details of the slip ring conductor are well known and need not be described herein. The slip ring conductor includes an inner portion which is mounted on the end of the shaft 14 and rotates with the shaft and an outer stationary portion which is fixed to the frame. Wires (not shown) connect an external power source to the stationary portion of the slip ring conductor.

The amplitude of the ultrasonic vibrations can be varied "on the fly" as the drum rotates by varying the electrical power which is supplied to the ultrasonic converter.

Compressed air is supplied to the pneumatic cylinders 47 and 49 through hoses 58 which connect each cylinder to a rotary air valve 59. The rotary air valve is conventional and includes a stationary inner portion which is fixed to the frame by a bracket 60 and a rotating outer portion which is connected to one of the end plates 15 and 16 of the drum. An external source of compressed air is connected to the stationary portion of the valve.

Figure 2B:
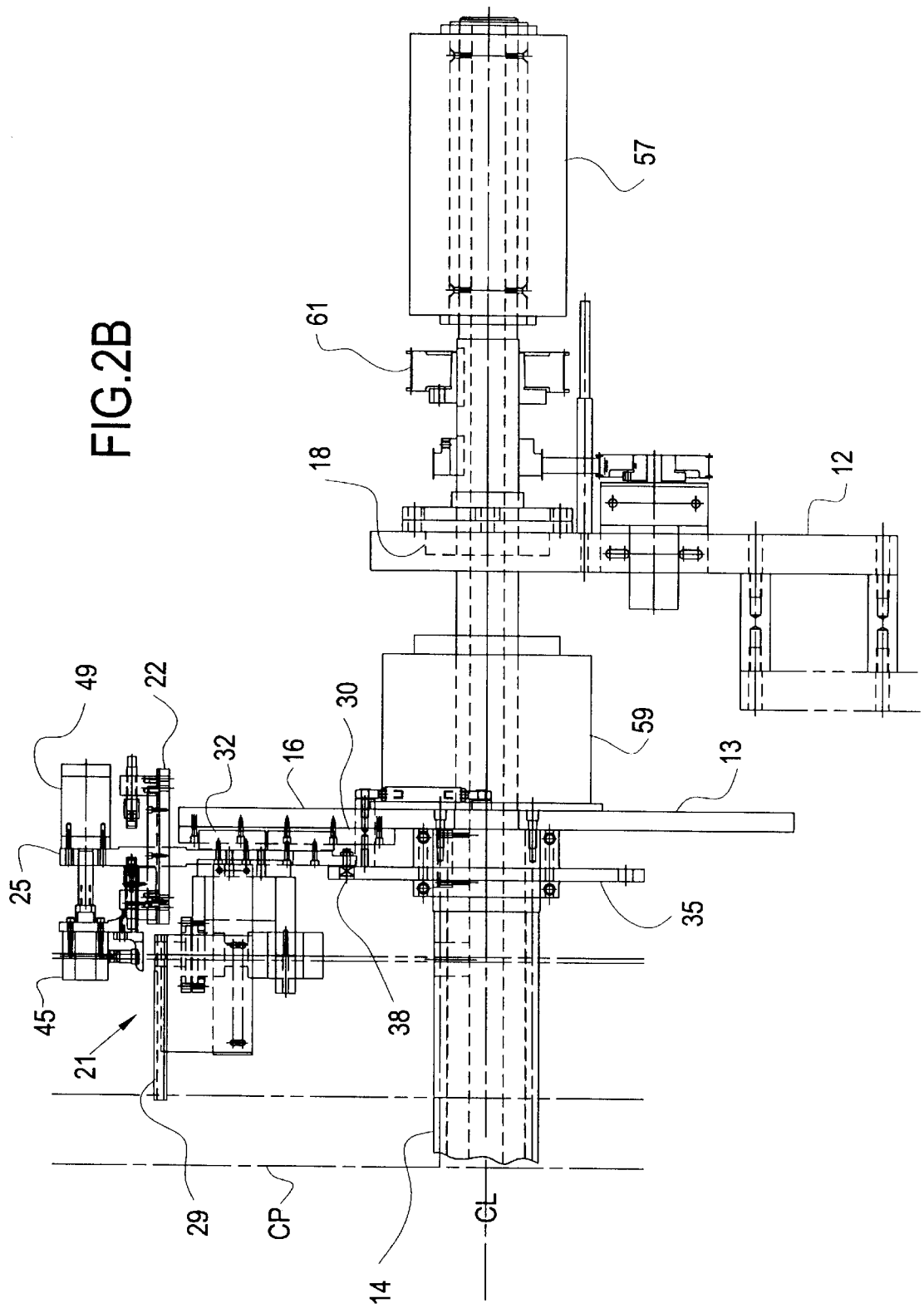
FIG. 2B is a fragmentary side elevational view of the rear portion of the apparatus of FIG. 1.

Referring to FIG. 2B, a pulley 60 is mounted on the rear end of the shaft. The pulley and shaft are rotated by a drive belt which is driven by a suitable motor.

Referring to FIG. 1, web material W is advanced from a source of web material, e.g., a roll mounted on an unwinder, and travels over roller 62 to the drum 13. The web material rotates with the drum and then travels over roller 63.

The web material can be, for example, two plies or layers of webs or sheets which are to be bonded together by the ultrasonic horn and anvil assemblies. One of the side edges of the web material is bonded by the horn and anvil assemblies which are mounted on the front plate 15 of the drum, and the other edge is bonded by the horn and anvil assemblies which are mounted on the rear plate 16 of the drum. The web-supporting surfaces 29 of the front and rear assemblies are separated at the center plane CP (FIGS. 2A and 2B) of the drum to accommodate material which is enclosed by the two plies of web material. If desired, however, the horn and anvil assemblies could be mounted on only one side of the drum.

In the embodiment illustrated in FIG. 1, the incoming web does not contact one of the web-supporting surfaces 29 of the drum until about the 8 o'clock position of the drum. The outgoing web leaves the web-supporting surface at about 5 o'clock. In order to allow the web to move into and out of contact with the web-supporting surfaces, the anvils 24 which are located between about 3:30 o'clock and about 8:30 o'clock are moved axially away from the edges of the web so that they do not interfere with the web. The rotary air valves 59 can be controlled by a programmable controller to actuate the pneumatic cylinders 47 and 49 at the appropriate time.

After the web contacts the web-supporting surface of a horn and anvil assembly, the pneumatic cylinder 49 moves the anvil axially into radial alignment with the horn, and the pneumatic cylinder 47 moves the anvil radially inwardly toward the horn to adjust the gap between the anvil and the horn. The rotary air valve supplies the appropriate pressure to provide the desired clamping force on the web.

The rotary speed of the drum 13 is such that the surface velocity of the web-supporting surfaces 29 matches the velocity of the web. The horn and anvil remain stationary relative to the web and bond the web under static conditions as the horn and anvil travel from about 8:30 o'clock to about 3:30 o'clock.

The surface velocity of the web-supporting surfaces 29 can be adjusted to match the velocity of the web by loosening the collar 36 and rotating the adjusting plate 35 as previously described. Greater changes in the diameter of the web-supporting surfaces, and therefore the surface velocity of the web-supporting surfaces, can be made by changing the length of the plates 25 of the horn and anvil assemblies or by moving cam followers 38 to a different set of slots 33 at a different radius.

Figure 8:
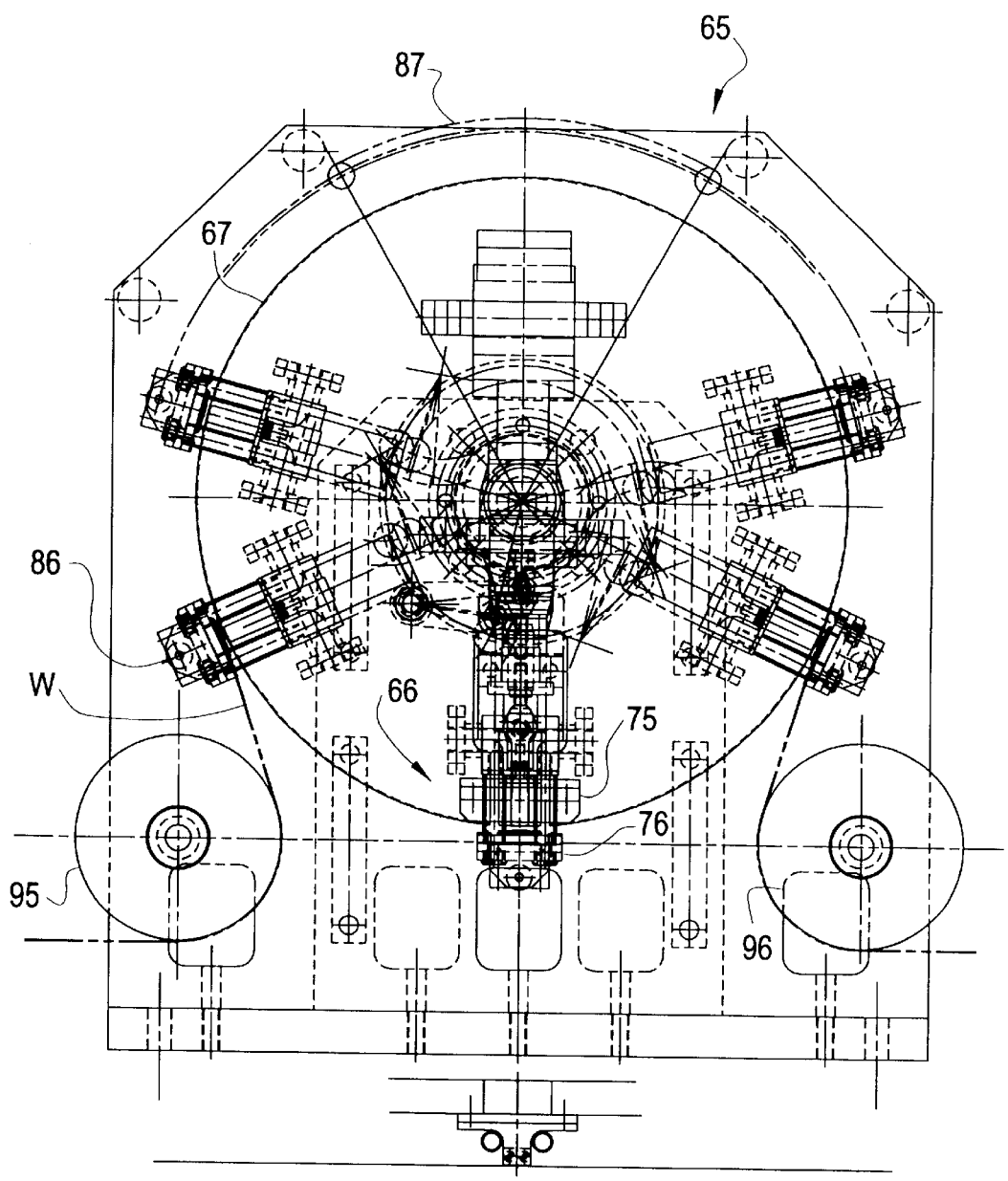
FIG. 8 is a fragmentary front elevational view of another embodiment of a rotary ultrasonic bonding apparatus.
Figure 9A:
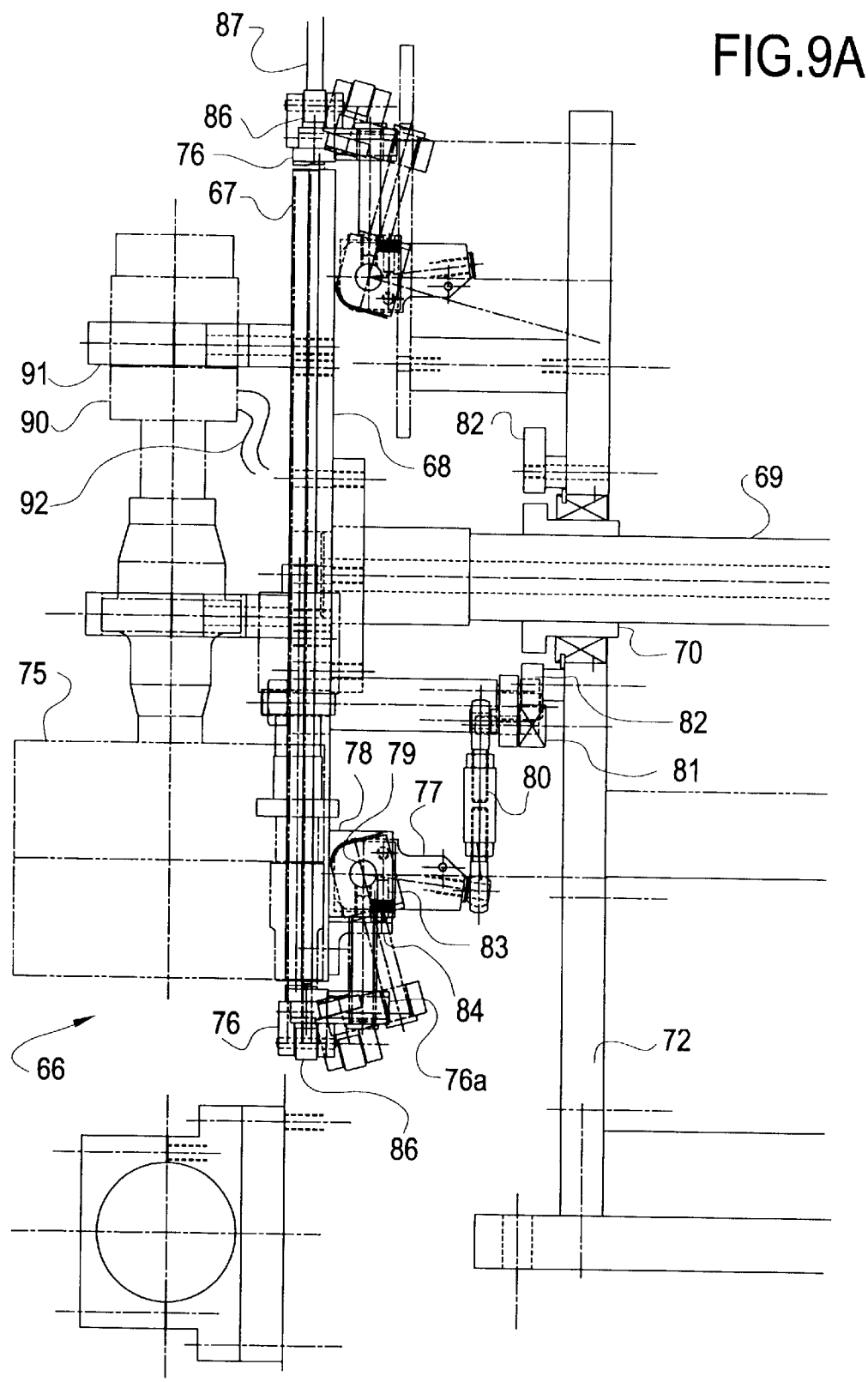
FIG. 9A is a fragmentary side elevational view of the front portion of the bonding apparatus of FIG. 5.
Figure 9B:
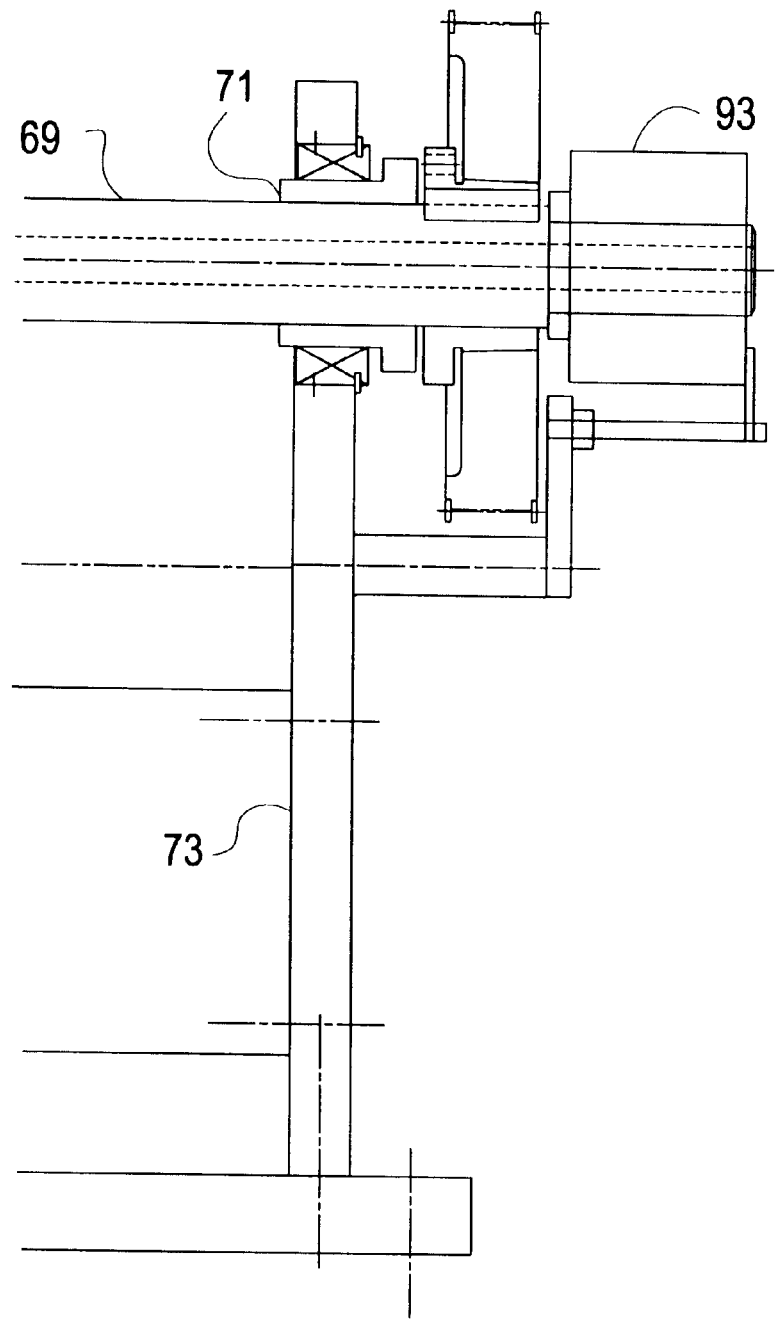
FIG. 9B is a fragmentary side elevational view of the rear portion of the apparatus of FIG. 5.

Another embodiment of a rotary ultrasonic bonding apparatus 65 is illustrated in FIGS. 8 and 9. A single ultrasonic horn and anvil assembly 66 is mounted on a rotatable drum 67. In FIG. 5 the horn and anvil assembly is aligned with the 6 o'clock position of the drum, and alternate positions of the anvil are shown at 8 o'clock, 10 o'clock, 2 o'clock, and 4 o'clock.

The drum 67 includes a vertical plate 68 which is mounted on a horizontal shaft 69. The outer surface of the plate provides a web-supporting surface. The shaft rotates in bearings 70 and 71 in front and rear frames 72 and 73.

The horn and anvil assembly includes a horn 75 which is mounted in an opening in the plate 68 of the drum, and a pivoting anvil 76. The anvil is mounted on a crank arm 77 which is pivotally attached to a bracket 78 on the plate 68 by pivot pin 79. The axis of the pivot pin extends parallel to a tangent to the drum plate 68 at the horn and perpendicular to the axis of the shaft 69. The crank arm 77 is pivoted by a link 80 and a cam follower 81 on the link which engages a circular cam 82 on the frame. The cam follower is urged toward the cam by a spring-biased pin 83 on the crank arm which engages an L-shaped bracket 84 on the plate 68.

The anvil is illustrated in solid outline in the position which is radially aligned with the horn. An alternate position is illustrated in phantom at 76a. When the anvil is radially aligned with the horn, a cam follower 86 on the anvil engages a cam 87 (see the upper part of FIG. 6A) on the frame. The cam 87 moves the anvil toward the horn during the portion of the rotation of the drum in which bonding occurs, adjusts the gap between the anvil and the horn, and applies the desired clamping force on the web.

An ultrasonic converter 90 for the horn is mounted on the plate 68 by bracket 91. Power is supplied to the converter by wires 92 which extend through the shaft to a slip ring conductor 93 (FIG. 9B) on the shaft. In one specific embodiment a 20 kHz ultrasonic unit was used.

Referring to FIG. 8, web material W is advanced over roller 95 to the drum 67. The web material rotates with the drum between about 8 o'clock and 4 o'clock and advances over roller 96. The anvil is pivoted by the cam 82 away from the horn and the outer surface of the drum between about 4 o'clock and 8 o'clock to permit the web to enter and leave the drum. After the anvil is radially aligned with the horn, the cam 87 moves the anvil toward the horn to clamp the web against the horn. The web and the drum travel at the same surface velocity, and static bonding can be performed throughout the period in which the web is supported by the drum.

The invention allows infinitely varying the bonding and cooling cycles. The prior art on a static application typically applied pressure, heat, and allowed for cooling prior to release. The invention takes the "static" principles and puts them in rotary motion. For example, U.S. Pat. No. 5,545,275 describes an opposing crank mechanism which theoretically matches web velocity at one finite point in time and offers an extremely small window for bonding time as compared to the invention.

The bonding and cooling cycles can be varied relative to various machine operating speeds. For example, FIG. 10 illustrates a typical bonding timing diagram in machine degrees in which 360° represents one complete rotation of the drum.

During the first 90°, the web is advanced onto the rotating bonding drum. The point at which bonding begins and the bonding duration are adjustable. In FIG. 10 bonding starts at about 130° and ends at about 160°. Bonding can be continuous or intermittent during the bond duration period. For a particular bond duration set point, the bond time is fixed throughout the machine speed range. Thus, bond duration in machine degrees is adjusted to maintain a fixed bond time for a particular machine speed. For example, for a faster machine speed the bond duration in machine degrees would be increased so that bond time remains constant. Bond duration therefore compensates for machine speed. Bonding intensity can also be adjusted by varying the ultrasonic energy.

In the example illustrated in FIG. 1, the cooling time extends from about 160° to about 270°. The web exits from the bonding drum during the last 90°.

Figure 10:
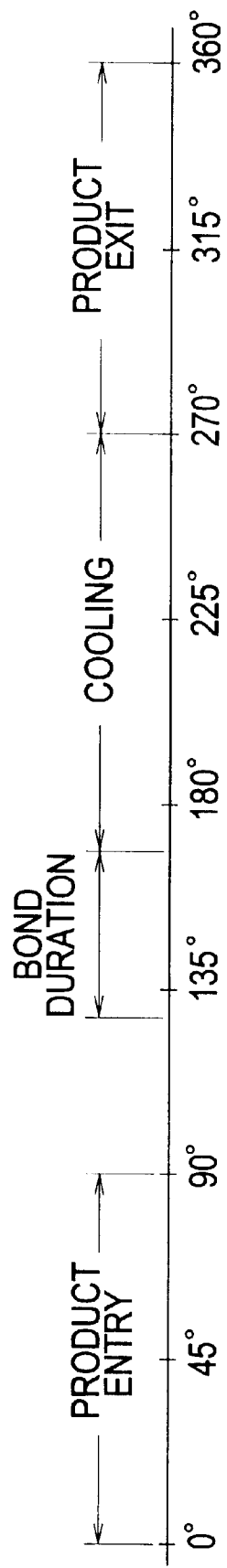
FIG. 10 is a representative timing diagram of a bonding cycle.

The timing chart of FIG. 10 is illustrative. The entry, bonding, cooling, and exit segments can be varied as desired.

The invention can also use thermo bonding rather than ultrasonic bonding. The horn 23 and anvil 24 are replaced with conventional elements which are used in thermo bonding. One or the other or both elements can be heated. Thermo bonding is particularly suitable for nonwoven materials.

The lower element can be heated to a temperature which is less than the melting point of the web, and the upper element can be heated above the melting point. The upper element is moved out of contact with the web during any machine stops to prevent the web from melting through.

While in the foregoing specification, a detailed description of specific embodiments of the invention was set forth for the purpose of illustration, it will be understood that many of the details hereingiven can be varied considerably by those skilled in the art without departing from the spirit and scope of the invention.

We claim:

1. A rotary bonding apparatus comprising:
    a frame,
    a drum rotatably mounted on the frame, the drum having a web-supporting surface and a central axis of rotation, the web surface of the drum being adapted to support web material which is to be bonded,
    a first bonding element mounted on the drum for rotation therewith,
    a second bonding element mounted on the drum for rotation therewith, the bonding elements being radially spaced to provide a gap at the web-supporting surface of the drum for web material which is to be bonded, whereby web material on the web-supporting surface remains substantially stationary relative to the bonding elements as the drum rotates.

2. The apparatus of claim 1 in which the first bonding element is mounted on the drum for movement in an axial direction and in a radial direction relative to the drum.

3. The apparatus of claim 1 including a first pneumatic cylinder mounted on the drum for moving the first bonding element in an axial direction and a second pneumatic cylinder mounted on the drum for moving the first bonding element in a radial direction.

4. The apparatus of claim 3 including a rotary air valve mounted on the drum for rotation therewith, the rotary air valve being connected to the pneumatic cylinders for supplying pressurized air thereto.

5. The apparatus of claim 1 in which the first bonding element is pivotally mounted on the drum for pivoting movement about an axis which extends parallel to a tangent to the outer surface of the drum at the gap and perpendicular to the axis of the drum.

6. The apparatus of claim 5 including a crank arm on the drum for pivoting the first bonding element, a cam follower connected to the crank arm, and a cam mounted on the frame and engageable with the cam follower for pivoting the crank arm and the first bonding element as the drum rotates.

7. The apparatus of claim 6 including a second cam mounted on the frame and engageable with the first bonding element as the drum rotates for moving the first bonding element radially to vary said gap as the drum rotates.

8. The apparatus of claim 5 including a cam mounted on the frame and engageable with the first bonding element as the drum rotates for moving the first bonding element radially to vary said gap as the drum rotates.

9. The apparatus of claim 5 in which the web-supporting surface of the drum is radially adjustable relative to the axis of the drum whereby the circumference provided by the web-supporting surface can be adjusted.

10. The apparatus of claim 5 in which the drum includes a rotatable shaft which extends along the axis of the drum and a plate mounted on the shaft for rotation therewith, and a support frame slidably mounted on the plate for radial sliding movement relative to the shaft, the bonding elements, and the web-supporting surface being mounted on the support frame.

11. The apparatus of claim 10 including means for adjusting the radial position of the support frame relative to the shaft.

12. The apparatus of claim 11 in which the adjusting means including a slot in the plate and a cam which is mounted on the support frame and extends into the slot.

13. The apparatus of claim 1 including a slip ring conductor mounted on the drum for conducting electrical power to one of the bonding elements.

14. The apparatus of claim 1 in which one of the bonding elements is radially adjustably mounted on the drum relative to the other bonding elements whereby the size of the gap can be adjusted.

15. The apparatus of claim 1 in which the first and second bonding elements are an anvil and an ultrasonic horn.

16. The apparatus of claim 1 in which the first and second bonding elements are thermo bonding elements.

17. A method of ultrasonic bonding a web material comprising the steps of:
   rotating a drum about an axis of rotation, the drum having a web-supporting surface,
   rotating an anvil and an ultrasonic horn with the drum and spacing the anvil and the horn in a radial direction to provide a gap therebetween,
   feeding web material into contact with the web-supporting surface of the rotating drum and into the gap between the anvil and the horn so that the web material rotates with the web-supporting surface and remains substantially stationary relative to the anvil and the horn, and
   applying ultrasonic energy to the web material with the horn.

18. The method of claim 17 including the step of moving the anvil axially relative to the web-supporting surface after the web material contacts the web-supporting surface to provide said gap.

19. The method of claim 17 including the step of pivoting the anvil relative to the web-supporting surface after the web material contacts the web-supporting surface to provide said radial gap.

20. The method of claim 17 in which ultrasonic energy is applied continuously to the web material during a bonding period.

21. The method of claim 17 in which ultrasonic energy is applied intermittently to the web material during a bonding period.

22. The method of claim 17 including the step of moving one of the anvil and the horn radially to compress the web material while ultrasonic energy is applied to the web material.

23. The method of claim 22 in which the compression of the web material is varied while ultrasonic energy is applied to the web material.

24. The method of claim 17 in which the ultrasonic energy which is applied to the web material varies.

25. The method of claim 17 in which the step of applying ultrasonic energy begins at a first point during the 360° rotation of the drum and ends at a second point during rotation of the drum, and adjusting the number of degrees between the first and second points to compensate for the rotational speed of the drum whereby the period of time during which ultrasonic energy is applied is maintained constant.

* * * * *